(12) United States Patent
Bjornstad

(10) Patent No.: US 8,315,267 B2
(45) Date of Patent: Nov. 20, 2012

(54) METHOD AND ARRANGEMENT FOR AN IMPROVED BUFFER SOLUTION WITHIN A COMMUNICATION NETWORK SWITCH

(75) Inventor: Steinar Bjornstad, Bekkestua (NO)

(73) Assignee: Transpacket AS, Oslo (NO)

( * ) Notice: Subject to any disclaimer, the term of this patent is extended or adjusted under 35 U.S.C. 154(b) by 434 days.

(21) Appl. No.: 10/586,633

(22) PCT Filed: Jan. 20, 2005

(86) PCT No.: PCT/NO2005/000023
§ 371 (c)(1),
(2), (4) Date: Sep. 25, 2006

(87) PCT Pub. No.: WO2005/069561
PCT Pub. Date: Jul. 28, 2005

(65) Prior Publication Data
US 2007/0206619 A1    Sep. 6, 2007

(30) Foreign Application Priority Data
Jan. 20, 2004 (NO) .................................. 20040263

(51) Int. Cl.
*H04L 12/28* (2006.01)
*H04J 14/00* (2006.01)
(52) U.S. Cl. ............... 370/412; 398/45; 398/46; 398/47; 398/49; 398/50; 398/52; 398/53; 398/54; 398/56; 398/57

(58) Field of Classification Search .................. None
See application file for complete search history.

(56) References Cited

U.S. PATENT DOCUMENTS

| | | | |
|---|---|---|---|
| 5,926,458 A | 7/1999 | Yin | |
| 6,101,193 A * | 8/2000 | Ohba | 370/429 |
| 6,252,848 B1 | 6/2001 | Skirmont | |
| 6,417,944 B1 | 7/2002 | Lahat et al. | |
| 6,577,418 B1 | 6/2003 | Boivie | |
| 6,819,870 B1 * | 11/2004 | Ge et al. | 398/51 |
| 7,266,295 B2 * | 9/2007 | Ovadia et al. | 398/51 |
| 2002/0196497 A1 * | 12/2002 | LoCascio et al. | 359/135 |
| 2003/0020982 A1 * | 1/2003 | Rychlicki | 359/124 |
| 2003/0076846 A1 * | 4/2003 | Heinz et al. | 370/404 |
| 2003/0128981 A1 * | 7/2003 | Shiomoto et al. | 398/48 |
| 2003/0189935 A1 | 10/2003 | Warden et al. | |
| 2004/0037561 A1 * | 2/2004 | Guild et al. | 398/79 |
| 2004/0151171 A1 * | 8/2004 | Lee et al. | 370/380 |

* cited by examiner

*Primary Examiner* — Ayaz Sheikh
*Assistant Examiner* — Sori Aga
(74) *Attorney, Agent, or Firm* — Diederiks & Whitelaw, PLC

(57) ABSTRACT

In asynchronous optical packet switches, scheduling packets from a buffer randomly will cause less efficient utilization of the buffer. Additionally, reordering of packets may cause problems for service quality demanding applications. According to the present invention a new electronic buffer scheduling algorithm is proposed and a switch utilizing this algorithm is disclosed. The algorithm is designed for utilizing the buffer resources efficiently, still avoiding serious packet reordering.

18 Claims, 2 Drawing Sheets

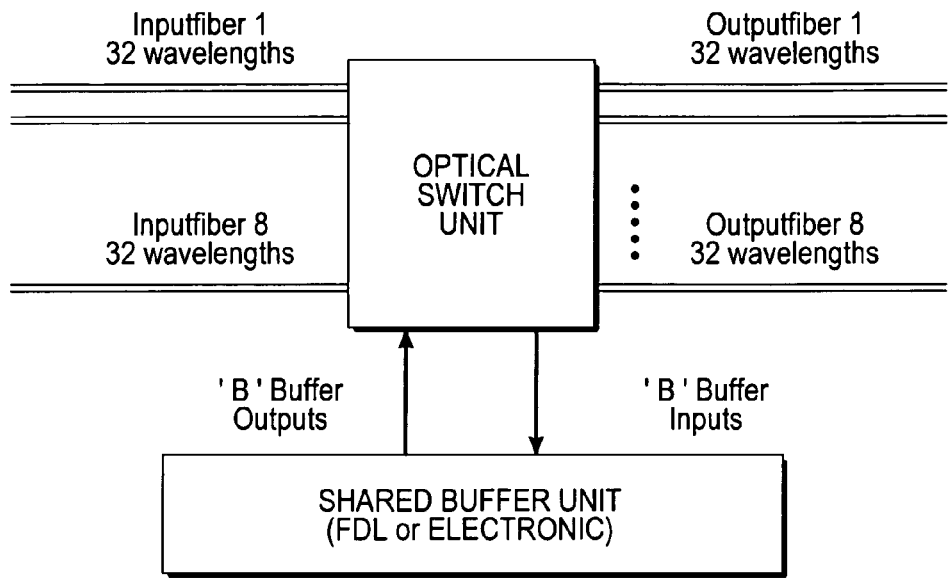
Fig._1
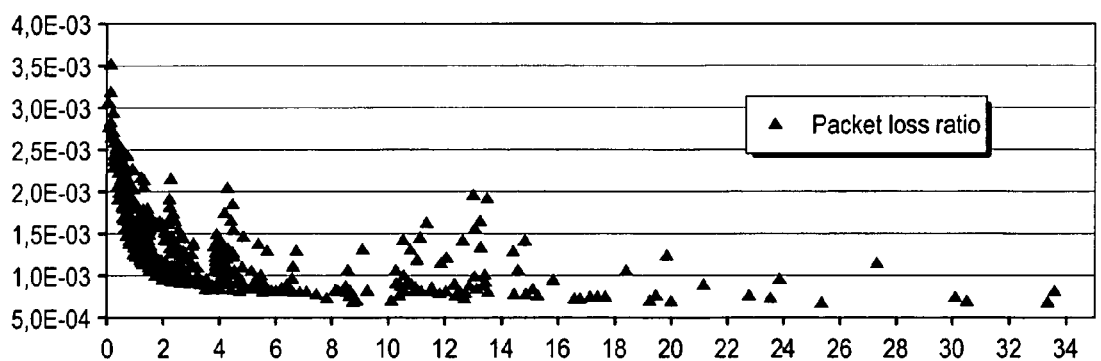
Fig._2

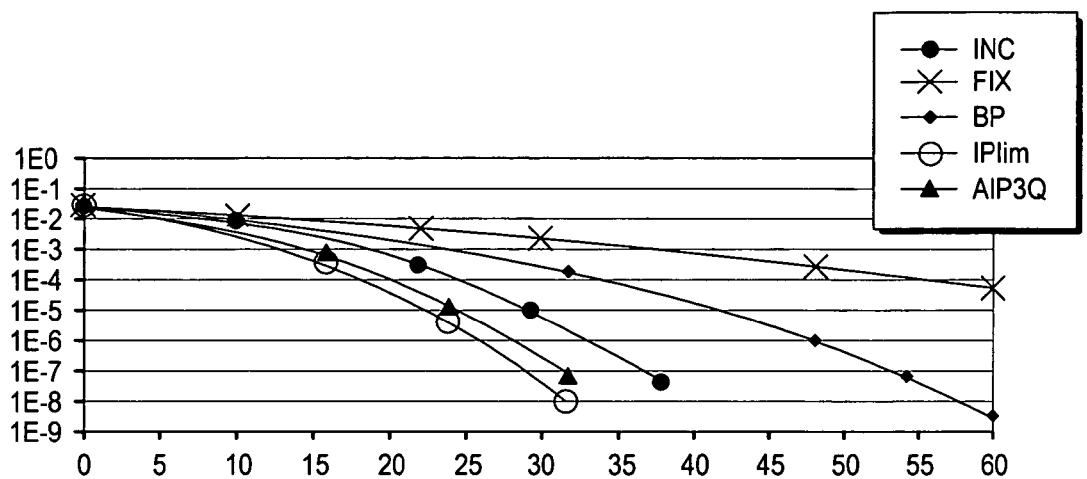
*Fig._3*
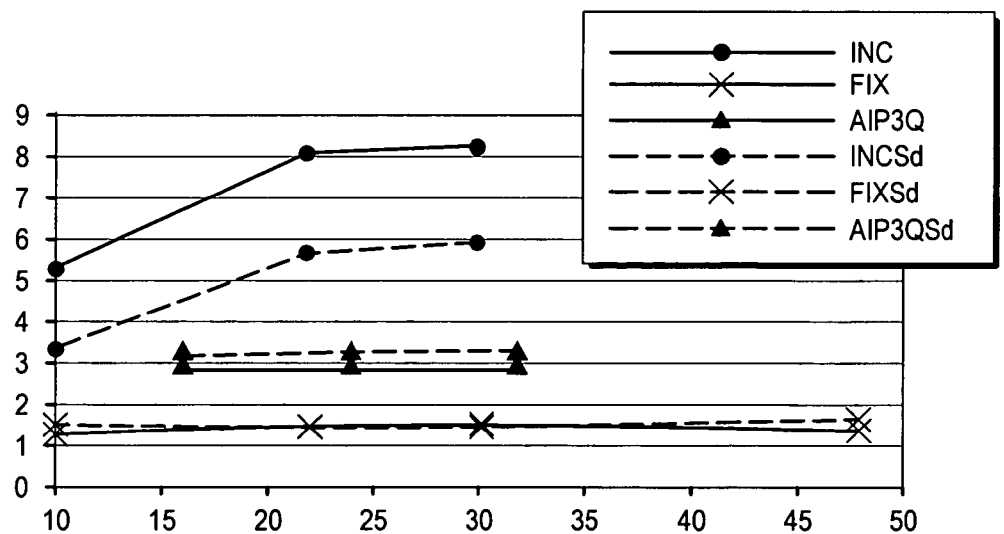
*Fig._4*

METHOD AND ARRANGEMENT FOR AN IMPROVED BUFFER SOLUTION WITHIN A COMMUNICATION NETWORK SWITCH

BACKGROUND OF THE INVENTION

1. Field of the Invention

The present invention relates to a switch and a method for organizing dataflow through a switch within packet switched or bursts switched networks. More particularly it relates to a switch within a telecommunication or data communication network, where the switch includes one or more outputs and a buffer unit, further it relates to a method for organizing dataflows in a telecommunication or data communication network including at least one switch where said switch is associated with at least one buffer.

2. Background Art

Despite the economic recession, network traffic continues to grow. Optical Packet Switching (OPS) is a promising candidate for a future cost effective network, supporting both high throughput and utilization. Two main issues of interest in OPS are however optical synchronization and buffering. Recently, a number of works have focused on using asynchronous packet switching, thereby avoiding the optical synchronization unit [1], [2]. (Bracketed references appear at the end of the specification.) Because of the immaturity of optical memory, Fiber Delay Line (FDL) based optical buffering in combination with using the wavelength dimension for contention resolution (i.e. a packet can be forwarded on an arbitrary wavelength leading to the destination), has been investigated [3], [2]. An alternative to FDL's is to use electronic memory with a limited number of buffer inputs [1,3]. In either case, buffer interfaces, consisting of FDL's or OE-converters (opto electronic converters), will represent a major cost factor for an optical packet switched system and should therefore be minimized [4].

Delay through an OPS network is negligible compared to transmission delay [1]. However, if the buffer has fewer input interfaces than the total number of switch inputs, only a fraction of the packets passing through the switch will be buffered and hence, delayed [1,4].

In an asynchronous system, if packets can be scheduled from the buffer to the outputs, without causing contention with new packets from the inputs, PLR (packet loss ratio) will be brought to a minimum limit. This approach is called In Input Priority (IP), since scheduling priority is given to the new packets arriving at the input, instead of to the buffered packets (i.e. Buffer Priority (BP)). In a Slotted IP system, this is simple. At the start of a time slot, packets in the buffer are scheduled only if there are vacant wavelengths after scheduling the packets arriving at the input. In asynchronous VLP (Variable Length Packets) operation, packet arrival and duration is not predictable. A new packet can arrive at the input at any random moment after a packet was scheduled from the buffer, hence making total Asynchronous IP (AIP) impossible when the number of buffer ports is limited.

Further, in asynchronous optical Metro packet rings, the same problem as above arises. When aggregating new packets onto the ring in the access nodes, packets already at the ring may contend with new packets. A detection circuit combined with a delay, e.g. a Fiber Delay Line (FDL), may be applied to first detect and then delay packets before passing the access node. However, this calls for extra components, both detectors and FDLs, making the principle potentially expensive. Additionally, in order to avoid packet collision when new packets enter the Metro ring, the FDLs will need to delay the packets longer than the duration of the longest of the new packets that enters the ring. This will impose additional delay of the packets already in the packet ring.

In this patent application, with reference to simulations, the ability of the fixed and incremental FDL buffering schemes described in [4], as well as electronic buffering, to support applications with a high demand to packet sequence and PLR is described.

Thus it is obvious that an asynchronous OPS system with a good PLR is needed. According to the present invention these and other problems will be solved using Asynchronous Input Priority.

SUMMARY OF THE INVENTION

It is an object of the present invention to provide an arrangement and a method avoiding the above described problems.

The features defined in the independent claims enclosed characterize this method.

In particular, the present invention provides a switch within an asynchronous communication network, where the switch includes one or more outputs and a buffer unit, said buffer unit is either an integral part of the switch or an external part of the switch adapted to communicate with the switch. The buffer unit is adapted to buffer the data and/or packets until a predefined number of wavelengths leading to a buffered packets destination is/are vacant.

Further the present invention discloses a method for organizing dataflows in an asynchronous communication network including at least one switch and/or Metro access node where said switch and/or Metro access node is associated with at least one buffer and at least a dataflow that can be divided into data packets said dataflow is communicating with the switch and/or Metro access node and the data packets are buffered in the buffer. The buffer units are buffering the data and/or packets until a predefined number of wavelengths leading to a buffered packets destination is/are vacant.

Furthermore according to the present invention we distribute buffered packets into a number of Queues in accordance with the packet length distribution. We optimize for systems using a wavelength dimension for contention resolution with the goal of optimizing the buffer performance with respect to minimizing Packet Loss Ratio (PLR) and packet reordering.

BRIEF DESCRIPTION OF THE DRAWINGS

In order to make the invention more readily understandable, the discussion that follows will refer to the accompanying drawing.

FIG. 1 illustrates a generic model of a simulated switch,

FIG. 2 is, for a switch, illustrating PLR (Y-axis) as a function of time packets stay in the buffer (X-axis). Clocking in and out of the buffer is not counted into the delay. Some of the plotted points, indicates both high PLR and delay. These points are a result of unfavorable combinations of $Wv_1$-$Wv_3$, FIG. 3 illustrates PLR (Y-axis) as a function of number of buffer interfaces (X-axis), Sd=Standard Deviation, FIG. 4 is illustrating Delay in units of duration of mean packet length (units, Y-axis), as a function of number of buffer interfaces (X-axis), Sd=Standard Deviation.

DETAILED DESCRIPTION

In the following is given a detailed description of a queue arrangement system of general usage; however for ease of understanding it is described with references to telecommunication and data communication systems. The disclosed arrangement and method is characterized in that it is very flexible in that it employs a feedback buffer, wherein the feedback buffer can be of any kind provided it can be accessed at an arbitrary point of time. Further to accomplish the advantages of the present invention the queue system will be of a type where there is a number of queues and the queues are prioritizing queues where certain parameters are used to decide the amount of queues and/or the dimensioning of the queues. Within telecommunication and/or data communication a natural choice for the criterion parameter is the length of the packets of data and/or the length of the data in other formats such as databursts, data streams or any other dataflow that can be split into packets.

"Switch" should be interpreted as any switch and/or Metro access node. "Data" should be interpreted as data and/or databursts and/or datastreams i.e. any arrangement of data that can be split into packets.

In the queue organization according to the present invention, long packets occupy more resources in the time domain as well as with respect to buffer size than short packets. Hence if packets were organized according to lengths in different queues/buffers one could organize the packet flow in a much more efficient way than having packets of any lengths within a queue/buffer. Imagine a picture where a number of main lanes are occupied with vehicles, and further an access ramp with a number of vehicles of different lengths that are supposed to access the number of main lanes. Then the necessary free space in the main lanes to be accessed is governed by the length of the front vehicle in the access ramp. Hence if this front vehicle is long it will hinder shorter vehicles access for an unnecessary long period of time. To the contrary, if one has an access ramp with a number of lanes, where vehicles are organized according to lengths one could increase the efficiency by letting short vehicles occupy small gaps between vehicles in the main lanes. This latter approach will increase efficiency and reduce congestion problems.

The basic idea behind the present invention is derived from the more well known traffic example concerning vehicles, hence following the approach of queue organization indicated above for data within a data communication or telecommunication network, one can describe the prioritization of queues with regard to the length of data packets where a first range of length of packets is associated with a first queue, a second range of packet length is associated to a second queue, a third range of packet length is associated with a third queue and an n'th length of packets is associated with queue number n.

A very effective use of the invention is within networks with optical packet switching employing wavelength division multiplexing (WDM) and where priority according to a set of rules are given regarding data entering a switch from the network, hence an input priority (IP) scheme will be described in details in the following with references to the accompanying drawings.

The described principle is intended to support applications with a high demand to packet sequence and PLR, still saving component costs. This is achieved using electronic buffering in combination with optical switching for optical packet switches. In Metro packet rings, electronic queuing systems are applied, using the buffering solution according to the present invention.

First example. An approximation to IP can be done, strongly reducing the contention problem caused by scheduling packets from the buffer. This is achieved when using the queue organization according to the present invention. PLR and reordering of packets is a trade off. To reduce the probability for contention, we can let the packets stay in the buffer until a given number of wavelengths leading to the buffered packets destination are vacant. The higher the number of wavelengths, the lower the probability for congestion. The drawback is that due to the increased delay of the buffered packets, the degree of packet reordering will also increase. A balance between delay and gained PLR must therefore be made.

The short packets will occupy the output-resources for a short time. The probability for the next packet arriving at the switch to be blocked when arriving at a random time after a short packet will therefore be lower than if the previous packet was a long packet. Since buffered short packets introduce a lower probability for contention than the long packets that are buffered, hence according to the present invention the buffered packets are divided into three queues according to the length of the packets. The number of wavelengths that need to be vacant before scheduling packets from the queue with short packets can be lower than for the queue with the medium length packets, which again has lower demands to a number of vacant wavelengths than the queue with the longest packets. The number of minimum vacant wavelengths before a queue is serviced can be defined as: $Wv_1$, $Wv_2$ and $Wv_3$ for the three queues respectively. An empirical Internet packet length distribution like in [1] is assumed, and the packet length ranges for the three queues is defined, $Q_1$, 40-44 bytes (B), $Q_2$ 45-576 B and $Q_3$ 577-1500 B. To set $Wv_i$, a simulation is performed for 32 wavelengths, 8 input fibers, assuming independent input sources and Poisson packet arrival, load 0.8, and set the number of buffer ports to 16. $Wv_1$-$Wv_3$ is then varied while always keeping $Wv_1 < Wv_2 < Wv_3$, finding the PLR as a function of mean delay of the buffered packets and the values of $Wv_1$-$Wv_3$. A generic model of the simulated switch and the simulation results are shown in FIGS. 1 and 2.

At a buffer delay of two mean packet lengths (three when counting delay caused by clocking), the PLR (packet loss ratio) are close to an asymptote. Hence this value of the delay is chosen and it is found by traversing the simulation data, that Wv1=5, Wv2=7 and Wv3=10.

To emulate the ideal case of total IP, i.e. no extra contention is caused by packets scheduled from the buffer, buffered packets can simply be dropped and not counted in the PLR statistics. This will give the minimum limit, titled IPlim in FIG. 3, for the achievable PLR in the described system. As a measure of packet reordering, the mean delay of the buffered packets and its Standard Deviation (Sd) is used. In FIG. 3, the PLR and delay parameters performance for different buffering schemes, also FDL buffering schemes not employing asynchronous input priority with three queues, is shown. The two FDL buffering schemes: INCremental FDL (INC), and FIXed FDL (FIX), both employ buffer priority, since buffered packets are scheduled (or dropped) as soon as they appear at the output of the FDL's. Also the performance of an electronic buffer with Buffer Priority (BP), where packets in the buffer are scheduled as soon as an output becomes available, is found.

In [5], it is suggested that demanding applications will require a PLR of $10^{-6}$ or better. In the following discussions, parameters for a PLR of $10^{-6}$ which is regarded as sufficient even for demanding real-time applications, are therefore compared. When using a reasonable number of buffer interfaces, the FIX scheme does not show a sufficiently low PLR. At the performance limit, IPlim, 27 buffer interfaces are required for achieving a sufficient PLR. The electronic BP scheme needs 46 interfaces, which is 70% higher than the limit, while using asynchronous input priority with three queues. The performance is very close to the limit. Using the INC scheme, 34 buffer interfaces, 26% more than the limit, is needed. This demonstrates that FDL buffering can be quite effective for reducing PLR in asynchronous packet switching.

However, looking at the delay performance, the INC scheme both shows the highest mean delay and Sd. See FIGS. 3 and 4. If these values are added, a value indicating a delay that it is likely to find some of the buffered packets. For the INC scheme, this value is 14 units. The mean packet length is 286 B. Comparing packets of equal length, assuming they belong to the same application, implies that in the worst case, some of the shortest packets of 40 B can be passed by more than (286 B/40 B)*14 units=100 short packets. This may limit the maximum bandwidth of an application, not tolerating packet reordering, to 1/100 of the links bandwidth. Studying the performance of asynchronous input priority with three queues according to the present invention (AIP 3Q in FIGS. 3 and 4), the sum of mean delay and its Sd equals 6 units. Doing the same calculation as above, application bandwidth may be limited to 1/43 of the links bandwidth. However, since the queue for short packets have the highest scheduling priority, the figure found must be considered as a conservative value compared to the value for the INC scheme. Looking at the BP scheme, packets can be scheduled as soon as they are clocked in to the buffer and a vacant output is found. The mean time a packet stays in the buffer is then found to be as low as $6.8*10^{-4}$ units, and therefore not plotted in the figure. Hence, packets of the same length may, because of the clocking of the packet into the buffer, be reordered on the link if the same packet is buffered in several preceding switches. Reordering of the packets of an application is therefore only likely if it demands a bandwidth close to the link bandwidth.

Future applications may have strict demands to both PLR and reordering of packets. Given an asynchronous optical packet switch with limited number of buffer interfaces, the achievable service quality with respect to the mentioned parameters has been evaluated for two electronic and two FDL based buffering schemes. Results show that fixed length FDL's are inefficient, and a sufficiently low PLR cannot be reached. The incremental length FDL's shows good PLR performance, however the figures for delay indicates that reordering of packets is likely to occur if the applications bandwidth demand is equal to or higher than 1/100 of the link bandwidth. When using electronic buffering, a trade off between PLR and packet reordering can be made. The suggested asynchronous input priority with three queues according to the present invention shows a PLR performance close to an achievable limit, while the critical applications bandwidth can be more than doubled compared with the use of the incremental FDL scheme. If the critical applications bandwidth is close to the link bandwidth, an electronic buffer priority (BP) scheme can be used, but at the cost of adding 70% more buffer interfaces. When choosing buffering scheme in optical packet switches, in addition to the implementation costs, also the service quality demands from future applications must therefore be carefully considered.

Second example. In the first example we described how packet data, data burst etc. were forwarded from the switch input to a number of buffers using asynchronous input priority with three queues according to the present invention.

However, this approach is but one out of a number of approaches where the principles of an asynchronous input priority algorithm with a number of queues according to the present invention can be utilized.

Imagine a system comprising a media access protocol for accessing an asynchronous (metro) packet ring. Following this approach, one will realize that, the only difference in principle is that the packets or databursts will be routed from external lines and directly to the number of buffers. More specifically the input to the buffers will be low bit rate lines—aggregating inputs—which will be aggregated in different queues to the switch' outputs.

Hence aggregation of packets in a number of different queues, where each queue, one or more, has packets with a defined packet length associated thereto, for access to a number of outputs, is described according to the present invention. The output can preferably be WDM outputs, and the buffers, or aggregating queues can be of an electronic or optical type. As will be evident from the foregoing the asynchronous input priority scheme with three queues according to the present invention is a most versatile method for traffic handling within a switch.

REFERENCES

[1] S. Bjørnstad et al., "A scalable optical packet switch for variable length packets employing shared electronic buffering." ECOC 2002, vol. 3, P. 4.7, 2002.
[2] F. Callegati, G. Corazza, C. Raffaelli: "Exploitation of DWDM for optical packet switching with quality of service guarantees", *IEEE J. Sel. Areas Comm.* vol. 20, no. 1, pp. 190-201, January 2002.
[3] M. J. O'Mahony, D. Simeonidou, D. K. Hunter, A. Tzanakaki: "The application of optical packet switching in future communication networks", *IEEE Comm. Mag.* vol. 3, no. 3, pp. 128-135, March 2001.
[4] C. Develder, M. Pickavet, P. Deemester: "Choosing an appropriate buffer strategy for an optical packet switch with a feed-back FDL buffer" In: *Proceedings of, ECOC* 2002, vol. 3, pp. 8.5.4 (2 pages).
[5] R. J. Gibbens . . . [et al.]: "*An approach to service level agreements for IP networks with differentiated services*", Statistical Laboratory, University of Cambridge and Internet and Data Networks, British Telecommunications plc., (Article submitted to Royal Society).

What is claimed is:

1. An optical switch for use in an asynchronous, wavelength-division-multiplexing, fiber-optic communication network, wherein the optical switch comprises:
   at least one fiber-optic input;
   at least one fiber-optic output; and
   a buffer unit comprising a plurality of queues,
wherein the optical switch is arranged to:
   receive data packets at the fiber-optic input;
   assign a received data packet, having an associated destination, to one of the queues;
   determine the number of vacant output wavelengths for the destination; and
   schedule the data packet from the queue only when at least a minimum number, greater than one, of output wavelengths for the destination are vacant.

2. The optical switch of claim 1, wherein each of the plurality of queues is associated with a respective range of data-packet lengths and is further associated with a respective minimum number of output wavelengths, and wherein the optical switch is further arranged to:
   assign the received data packet to one of the queues according to the length of the data packet; and
   schedule the data packet from the queue only when at least the associated minimum number of output wavelengths for the destination are vacant, wherein the minimum number of output wavelengths is smaller for a queue associated with relatively-short data packets than it is for a queue associated with relatively-long data packets.

3. The optical switch of claim 2, wherein the buffer unit comprises at least first, second and third queues associated with respective first, second and third ranges of data-packet lengths of increasing size, and further associated with first, second and third respective minimum numbers of output wavelengths of increasing size.

4. The optical switch of claim 1, further arranged to buffer only a fraction of the data packets passing through the optical switch.

5. The optical switch of claim 1, comprising a plurality of fiber-optic inputs and at least one fiber-optic output which operates at a higher bit-rate than the plurality of fiber-optic inputs.

6. The optical switch of claim 1, further adapted to operate within a network selected from the group consisting of: an optical packet switched network; an optical burst switched network; an electronic packet switched network; an electronic burst switched network; and a wavelength-division-multiplexed network.

7. The optical switch of claim 1, wherein the buffer unit comprises an electronic buffer and is configured to buffer data packets electronically.

8. The optical switch of claim 1, configured to receive wavelength-division-multiplexed signals at the fibre-optic input.

9. The optical switch of claim 1, configured to send wavelength-division-multiplexed signals from the fibre-optic output.

10. A method of switching data in an asynchronous, wavelength-division-multiplexing, fiber-optic communication network, comprising:
   receiving data packets at a fiber-optic input of an optical switch;
   assigning a received data packet, having an associated destination, to one of a plurality of queues in a buffer unit;
   determining the number of vacant output wavelengths from the optical switch for the destination; and
   scheduling the data packet from the queue only when at least a minimum number, greater than one, of output wavelengths for the destination are vacant.

11. The method of claim 10, wherein each of the plurality of queues is associated with a respective range of data-packet lengths and is further associated with a respective minimum number of output wavelengths, the method further comprising:
   assigning the received data packet to one of the queues according to the length of the data packet; and
   scheduling the data packet from the queue only when at least the associated minimum number of output wavelengths for the destination are vacant, wherein the minimum number of output wavelengths is smaller for a queue associated with relatively-short data packets than it is for a queue associated with relatively-long data packets.

12. The method of claim 11, comprising:
   assigning received data packets to at least first, second and third queues associated with respective first, second and third ranges of data-packet lengths of increasing size; and
   scheduling the data packets from the first, second and third queues only when at least first, second and third respective minimum numbers of output wavelengths for the destinations of the data packets are vacant, wherein the first, second and third minimum numbers are of increasing size.

13. The method of claim 10, further comprising buffering only a fraction of the data packets passing through the optical switch.

14. The method of claim 10, further comprising receiving data packets at a plurality of fiber-optic inputs at a receive bit-rate and sending a data packet from a fiber-optic output at a send bit-rate which is higher than the receive bit-rate.

15. The method of claim 10, wherein the network is a network selected from the group consisting of: an optical packet switched network; an optical burst switched network; an electronic packet switched network; an electronic burst switched network; and a wavelength-division-multiplexed network.

16. The method of claim 10, wherein the buffer unit comprises an electronic buffer, the method further comprising buffering data packets electronically in the buffer unit.

17. The method of claim 10, further comprising receiving wavelength-division-multiplexed signals at the fibre-optic input.

18. The method of claim 10, further comprising sending wavelength-division-multiplexed signals from the fibre-optic output.

* * * * *